United States Patent [19]
White et al.

[11] 3,744,757
[45] July 10, 1973

[54] VEHICLE JACK

[76] Inventors: Bobbie L. White, 6615 Canal Boulevard; James L. Sanders, 3508 Penick, both of Shreveport, La.

[22] Filed: Mar. 8, 1971

[21] Appl. No.: 122,113

[52] U.S. Cl. .................................................. 254/94
[51] Int. Cl. .................................................. B66f 7/22
[58] Field of Search ............................. 254/86, 94

[56] References Cited
UNITED STATES PATENTS

| | | |
|---|---|---|
| 2,343,459 | 3/1944 | Hines ................................. 254/94 |
| 3,093,362 | 6/1963 | Schaefer .......................... 254/86 R |
| 2,634,941 | 4/1953 | Eckert ............................. 254/86 R |
| 3,220,699 | 11/1965 | Falk ................................. 254/94 |

Primary Examiner—Othell M. Simpson
Attorney—John M. Harrison

[57] ABSTRACT

A vehicle jack which includes a means for securing the jack to the vehicle, an adjustable support member, one end of which is pivotally connected to the vehicle, and a ground contact member movably secured to the opposite end of the support member and adapted for limited pivotal movement with respect to the support member.

4 Claims, 5 Drawing Figures

PATENTED JUL 10 1973 3,744,757
INVENTORS
BOBBIE L. WHITE
J. L. SANDERS
ATTORNEY
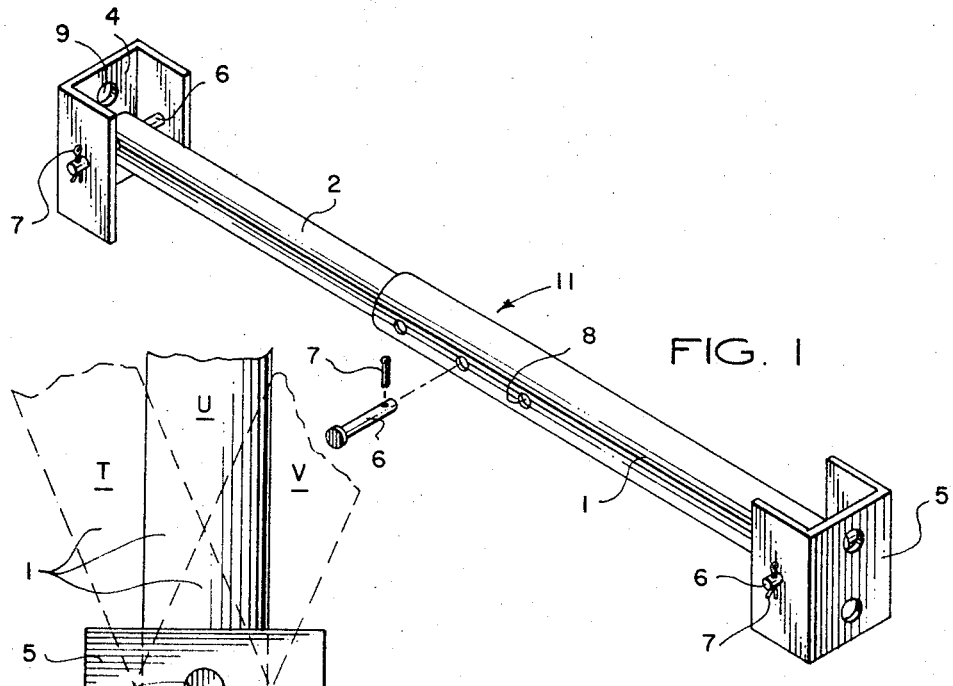
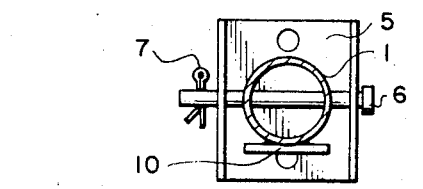
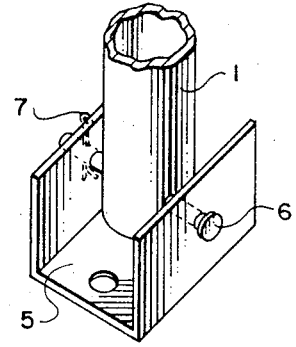
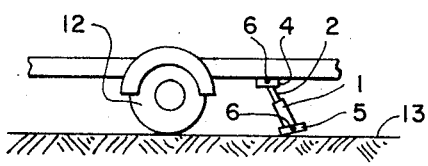
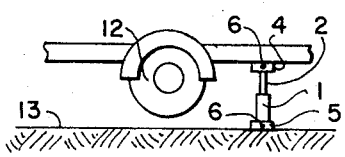

VEHICLE JACK

BACKGROUND OF THE INVENTION

1. Field of the Invention

This invention relates to a new and improved jacking device whereby boat trailers and the like may be elevated and supported to enable repairs to be undertaken. The trailer jack of this invention is simple, safe and easy to use; for example, it may be mounted on the trailer frame itself and when the need arises for use, one end of the jack may be dropped to the ground, the trailer backed up, and then lifted as the jack becomes operable. Alternatively, the device can be carried in the trunk of a car and may be quickly and easily mounted on the frame of the trailer when jacking becomes necessary.

2. Description of the Prior Art

Heretofore, various jacking apparatus have been developed to provide elevation of trailers and other vehicles in order to stabilize or effect repairs thereon. Illustrative is the trailer jack of U.S. Pat. No. 2,519,364 to H. M. Fredholm, which discloses a jack consisting essentially of a large turnbuckle having a foot pad or support plate, and a bracket for mounting on the trailer frame. The turnbuckle can be rotated on threaded members to provide adjustable height for the trailer. Similarly, U.S. Pat. No. 2,490,668 to R. Burgett discloses a jack consisting of a pair of parallel legs which are adjustable, the ends of which are mounted on a ground-engaging member and the trailer frame, respectively. The jack is ordinarily carried in a stored position essentially parallel with the frame of the trailer, and when its use is necessary, the ground engaging plate or foot is loosened from the frame and dropped to the ground. The trailer is then backed onto the jack and lifted accordingly.

Conventional trailer jacks such as the ones disclosed in the heretofore noted patents are characterized by several undesirable features, chief among which is the tendency for the ground engaging portion of the jack to slip or skid as the trailer is backed for the jacking operation. For example, referring to the heretofore noted patents, it will be appreciated that the support members or member, as the case may be, are connected to the ground engaging plate or foot pad in substantially unlimited pivotal attachment; accordingly, if the trailer body is very close to the ground due to a flat tire or the like, the base plate or foot pad may slip or skid dangerously backwards rather than immediately supporting the trailer when it is backed up. Furthermore, in the patent to H. M. Fredholm, it would appear that the turnbuckle-type jack is susceptible of being vibrated out of adjustment in the ordinary course of travel, while the vehicle jack disclosed in the R. Burgett patent is subject to the disadvantage of having to adjust both legs when a height alteration is desired.

U.S. Pat. No. 3,164,37 to C. A. Royle discloses a jack which utilizes a support member and ground contact member which is rigidly connected to the support member. It has been found in field trials that this arrangement frequently results in skidding and slipping of the ground contact member with respect to the ground, particularly where the vehicle to be jacked is characterized by a low profile. For example, boat trailers are built to travel quite close to the ground, and must frequently be elevated to a sufficiently high level to enable changing flat tires. Accordingly, the vehicle jack utilized must operate in a cofined space between the vehicle frame and the ground, and must function to lift the vehicle to a desired level. Under these circumstances, jacks which are known in the prior art and which are characterized by freely pivoting or rigid ground contact members, or not such ground support at all, frequently slip and skid along the ground or road surface instead of providing a reliable and smooth vehicle elevating mechanism.

Accordingly, an object of this invention is to provide a new and improved method of jacking trailers, and particularly boat and other light, low profile trailers, to effect repair work.

Another object of the invention is to provide a safe, quick jacking device for trailers which enable repairs to be effected in a minimum length of time.

Still another object of the invention is to provide a trailer jack having a ground contact member connected in limited pivotal attachment to the jack support member to insure a nonslip, nonskid, uniform jacking operation on substantially any terrain.

Another object of the invention is to provide a trailer jack which may be carried on the trailer frame and can be utilized by first dropping one end of the jack to the ground, and subsequently backing or pulling the trailer into a supported position on the jack.

Yet another object of the invention is to provide a trailer jack which is light, adjustable and yet sufficiently strong to be utilized in repairing trailers having a wide variety of design profile and weight characteristics.

Another object of the invention is to provide a trailer jack wich needs no lubrication and is not adversely affected by contact with water.

Still another object of the invention is to provide a quick drop jack for boat and other trailers which is simple in design, and has no ratchet or other lifting mechanism which is subject to jamming or rusting.

SUMMARY OF THE INVENTION

These and other objects of the invention are provided in a vehicle jack which includes a mounting means, such as a bracket, adapted for removable attachment to a vehicle, a support member pivotally connected to the mounting means, a ground contact member connected to the support member in limited pivotal attachment at the opposite end from the mounting means, and suitable stop means in cooperation with the support member whereby the support member is adapted to engage the ground contact member at a preselected angle between the support member and the ground contact member.

BRIEF DESCRIPTION OF THE DRAWINGS

The invention will be better understood in view of the following description presented with reference to the accompanying drawings.

FIG. 1 of the drawings is a perspective view of the vehicle jack of this invention;

FIG. 2 is a side view of the support member and ground contact member illustrating the positions which the support member may take with respect to the ground contact member;

FIG. 3 is a perspective view of a preferred pivotal relationship between support member and the ground contact member;

FIG. 4 is an end view of the support member and preferred mounting bracket with mounting bracket stop means in place; and FIG. 5 is a side view illustrating the jacking operation.

DESCRIPTION OF THE PREFERRED EMBODIMENTS

Referring now to FIGURE 1 of the drawings, the vehicle jack generally indicated by reference numeral 11 is disclosed, which includes a support member represented by concentric metal tubing 1 and 2, having holes drilled therein and adapted to register, in order to provide for a variation in the length of the support member. Pin 6 is adapted to traverse the registering holes, and retaining pin 7 may be inserted through pin 6 at the indicated point in order to secure it. Although it is preferred to use concentric tubing, and more preferably galvanized metal tubing in the invention, it will be recognized that other support shapes may be utilized as the support member, such as sliding channels and the like, according to the knowledge of those skilled in the art. To one end of the support member is mounted a mounting bracket 4 illustrated in the form of a clevis, which mounting bracket is freely pivotally connected to the support member by means of pin 6, also secured by a retaining pin 7. Mounting bracket 4 is equipped with holes 9 in order to provide a convenient means of mounting the bracket onto the trailer body, and it will be appreciated that it is preferred to allow the support member to freely pivot on the mounting bracket, as will be heretofore discussed in greater detail. To the other end of the support member represented by concentric tubing 1 and 2, is pivotally attached a ground contact member 5, and which is also preferably secured to the support member by pin 6 and retaining pin 7.

FIG. 2 more particularly illustrates the connective relationship between the upper portion of the jack support member represented in this figure by reference numeral 1, and ground contact member 5. It has been found that when these two members are connected as shown in the diagram, the jack can be made highly stable and free from skidding or slipping when the vehicle is being elevated. In order to incorporate a nonskid, nonslip feature into the jack of the incident invention it has been found that support member 1 must be pivotally connected to ground contact member 5 in such a manner as to provide for contact of support member 1 with the bottom of ground contact member 5 at points A and B, illustrated in FIG. 2 of the drawings. When ground contact member 5 is placed with edge on the ground, and support member 1 is in the position indicated by the letter T shown in FIG. 2, and as illustrated in FIG. 5, the jack is in a nonslipping and nonskidding position when pressure is applied to make the jack operable. However, it will be appreciated that if support member 1 were freely pivotal with respect to ground contact member 5, and were not constrained to remain in position T, illustrated in FIG. 2, that ground contact member 5 is free to slide in a horizontal plane along the ground or road surface to defeat the desired jacking operation. Similar slippage occurs when the ground contact member is rigidly affixed to the support member. Through field tests it has further been discovered that in order to provide maximum nonslip and nonskid conditions for jacking a trailer, it is preferred that support member 1 define an angle of not less than 72° with respect to ground contact member 5, when support member 1 is in position and as illustrated on the drawing. Conversely, when support member 1 is in the position indicated by the letter V in FIG. 2 of the drawings, it is preferred that this member not exceed an angle of 108° with respect to ground contact member 5. Tests show that preferred acute angles of support member travel with respect to ground contact member 5, when support member 1 is characterized by a diameter of 1 ½ inches, are from about 72° to about 77°, and preferred obtuse angles under these conditions range from about 103° to about 108°. Of course, it will be recognized by those skilled in the art that this angular variation will be different for support members of varying size and shape which are designed to carry heavier or lighter loads, as the case may be. For example, where a 2 inch diameter support member is utilized in the invention, an acute angular variation of about 10°, i.e., from about 67° to about 77°, and obtuse variation of from about 103° to about 113°, may be realized due to the larger pipe diameter. Of course, when the jack is in its fully operable position supporting the trailer or other vehicle, this position is represented by the letter U in FIG. 2 of the drawings.

Referring now to FIG. 3 of the drawings, the limited pivotal relationship between support member 1 and ground contact member 5 is further illustrated, more particularly showing the function of pin 6 and retaining pin 7, which provide the desired angular movement.

FIG. 4 illustrates still another preferred embodiment of the invention wherein a plate 10 or other stop means is welded or otherwise attached to mounting bracket 4 in order to prevent support member 1 from moving through an angle of greater than 90° with respect to mounting bracket 4. In this manner, as illustrated further in FIG. 2, support member 1 may move into the position indicated by the letters T and U, but cannot exceed an angle of 90° with respect to ground contact member 5, and therefore cannot move into the position represented by the letter V in the figure. In this manner it is possible to provide a method of insuring that the trailer will be jacked to maximum height above the ground, and yet will not continue in backward movement and fall to the ground on the other side of the jack.

As previously noted, FIG. 5 of the drawings more particularly discloses the pivotal function of ground contact member 5 with respect to support member 1. As backing force is applied to trailer frame, this force is transmitted from the frame through the support member represented by reference numerals 1 and 2, to ground contact member 5, pivotally attached to the support member. Firm, nonslipping contact of ground contact member 5 with ground surface 13 is provided through the particular and critical angular relationship between the support member and ground contact member. As backward movement of the trailer continues, the support member swings upwardly around the ground contact member pivot to a desired supporting position.

It will be recognized by those skilled in the art that many different variations of the inventive embodiment are possible. For example, while mounting bracket and ground support members 4 and 5 as illustrated in the drawing are preferably in the form of a clevis pivotally attached to the support member, it will be recognized that other structural bodies which perform essentially the same function can be utilized in the invention. For example, mounting bracket 4 may take the form of a plate having a single rib welded thereto, which rib is adapted to fit into a slot in the support member and may be pinned to that support member through registering holes in the support member and the rib. A similar attachment might be devised for ground contact member 5, so long as the required angular relationship between the support member and the ground contact member is maintained in order to provide a nonskid and nonslipping jacking operation according to the disclosure of this invention. Still other variations in structural form will be apparent according to the knowledge of those skilled in the art.

In operation it will be appreciated that the jack is further characterized by flexibility, in that it may be mounted on the frame of the trailer or other vehicle for quick and easy application when needed, or alternatively, since it is light and easily manipulated, it may be carried elsewhere on the vehicle or in the trunk of the car for use as desired. When mounted on a trailer, the jack is preferably attached by means of mounting bracket 4 to the trailer frame and carried in an essentially horizontal position on the frame itself. Alternatively, the jack may be attached to the vehicle frame by means of a bolt and wing nut, or similar fastener, which connects the support member directly to the frame without the necessity of using a mounting bracket. Under circumstances where use of a mounting bracket is desired, it is preferable for ease of manufacture to use substantially identically shaped members as the mounting bracket and ground contact members.

Having thus described our invention, we claim:

1. A vehicle jack adapted for removable attachment to a vehicle comprising a support member, a first clevis pivotally connected to one end of said support member, a second clevis having a general U-shaped configuration pivotally connected to the opposite end of said support member with the bight portion thereof positioned with respect to the end and pivot of said support member in such a manner as to prevent the bottom of said clevis from describing an angle of less than about 72° or more than about 108° with respect to said support member when the bottom edge of said clevis is placed on the ground and said vehicle jack is in use.

2. The vehicle jack of claim 1 further characterized by stop means in cooperation with said second clevis and said support member to prevent said support member from describing an angle of greater than 90° with respect to said second clevis.

3. The vehicle jack of claim 1 wherein said support member is adjustable.

4. The vehicle jack of claim 1 wherein said support member further comprises first and second telescoping, concentric tubing provided with registering holes and pins, said pins adapted to traverse said holes to provide height adjustment of said vehicle jack.

* * * * *